Aug. 5, 1958  J. L. KEYMER  2,845,718
AXLE ALIGNING DEVICE
Filed Jan. 18, 1955  3 Sheets-Sheet 1
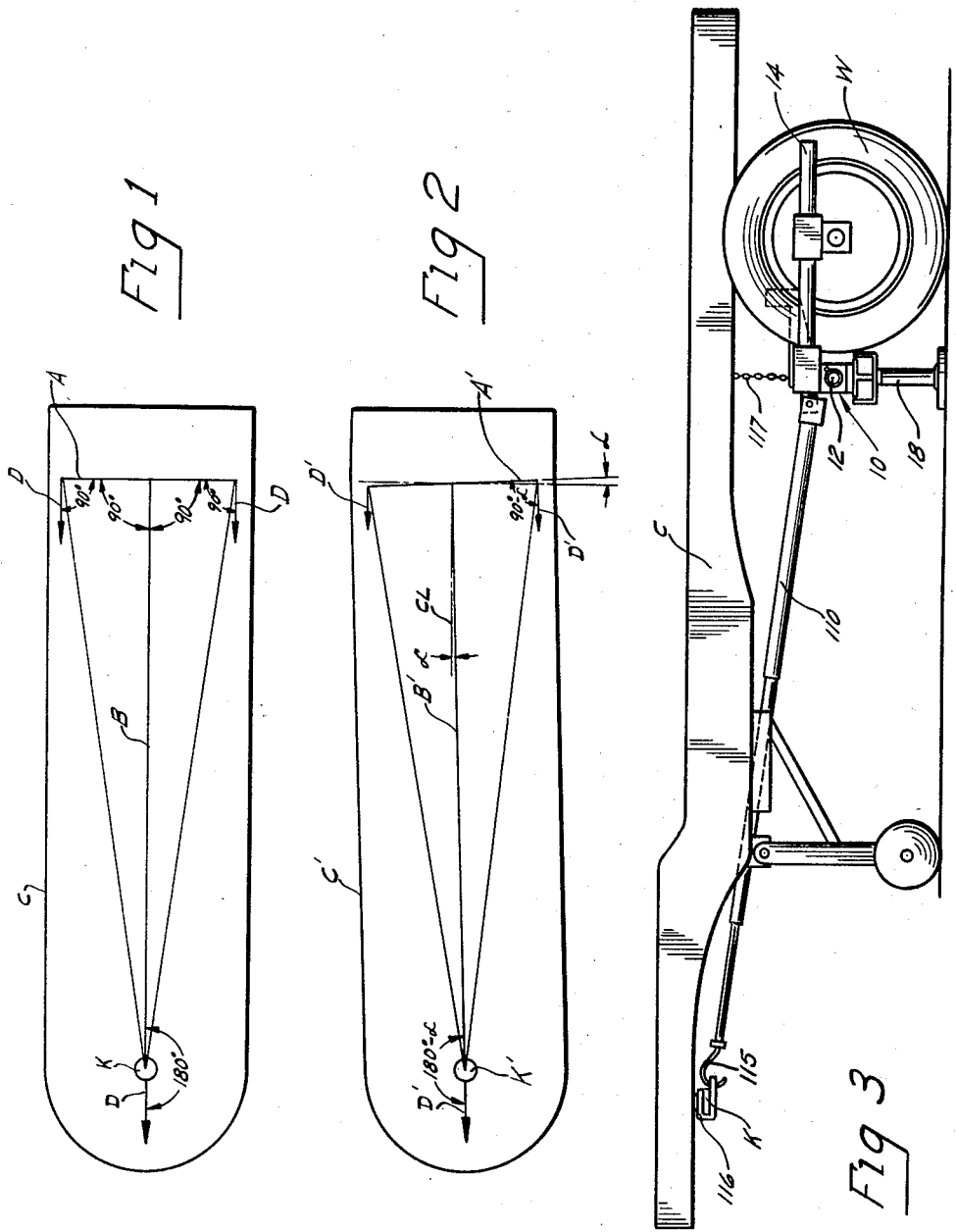
INVENTOR.
JOHN L. KEYMER
BY
Bosworth Sessions Herrstrom
& Fowler
ATTORNEYS Aug. 5, 1958 J. L. KEYMER 2,845,718
AXLE ALIGNING DEVICE
Filed Jan. 18, 1955 3 Sheets-Sheet 2
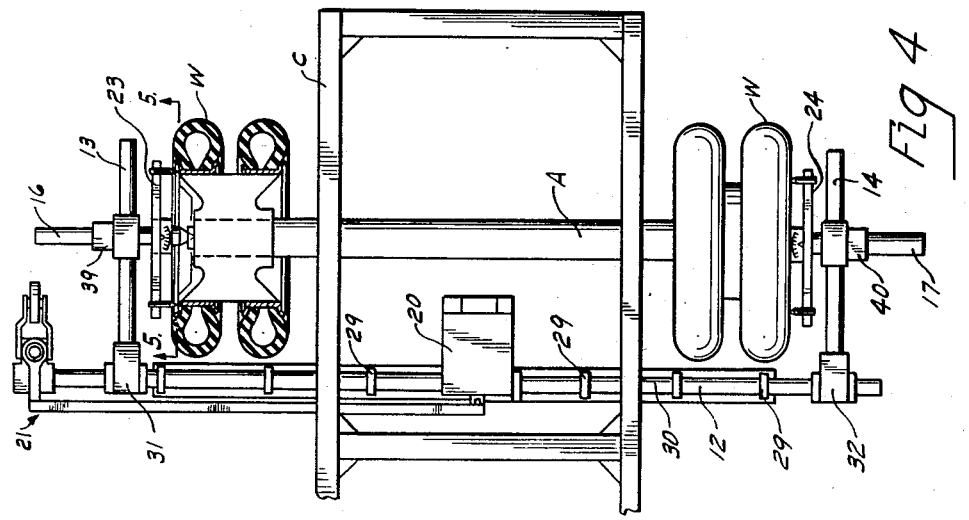
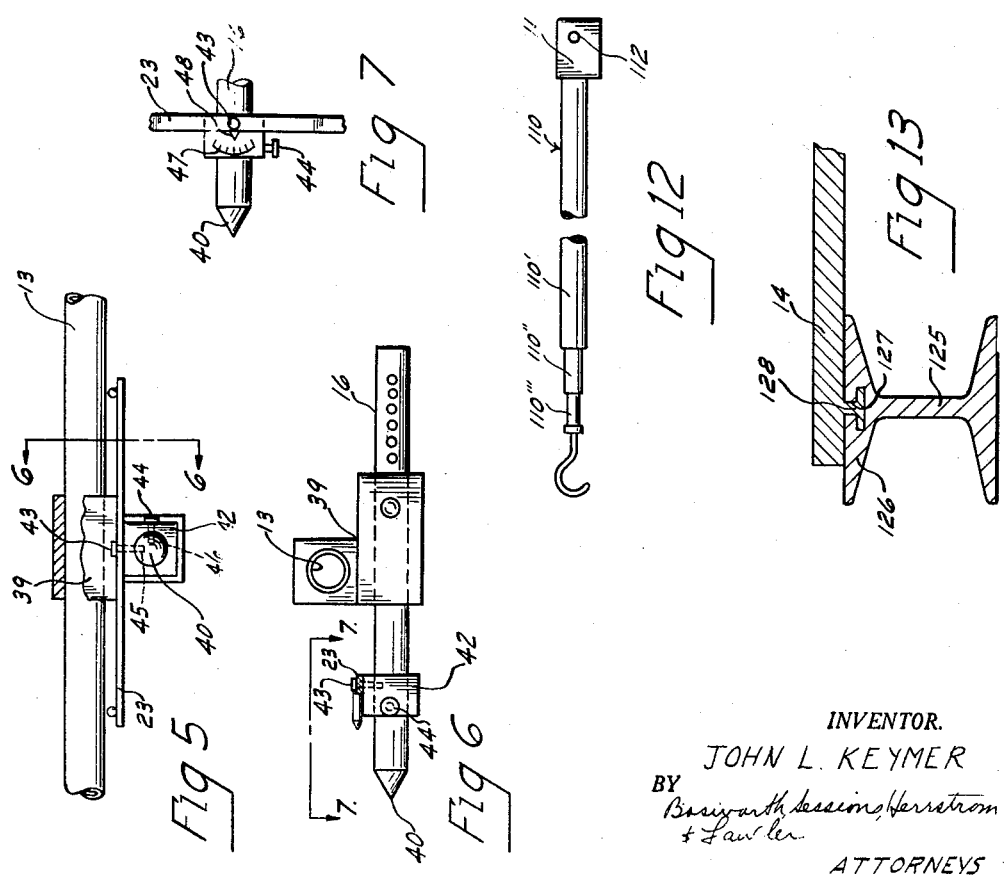
INVENTOR.
JOHN L. KEYMER
BY
Bosworth, Sessions, Herrstrom
& Lawler
ATTORNEYS Aug. 5, 1958 J. L. KEYMER 2,845,718
AXLE ALIGNING DEVICE
Filed Jan. 18, 1955 3 Sheets-Sheet 3
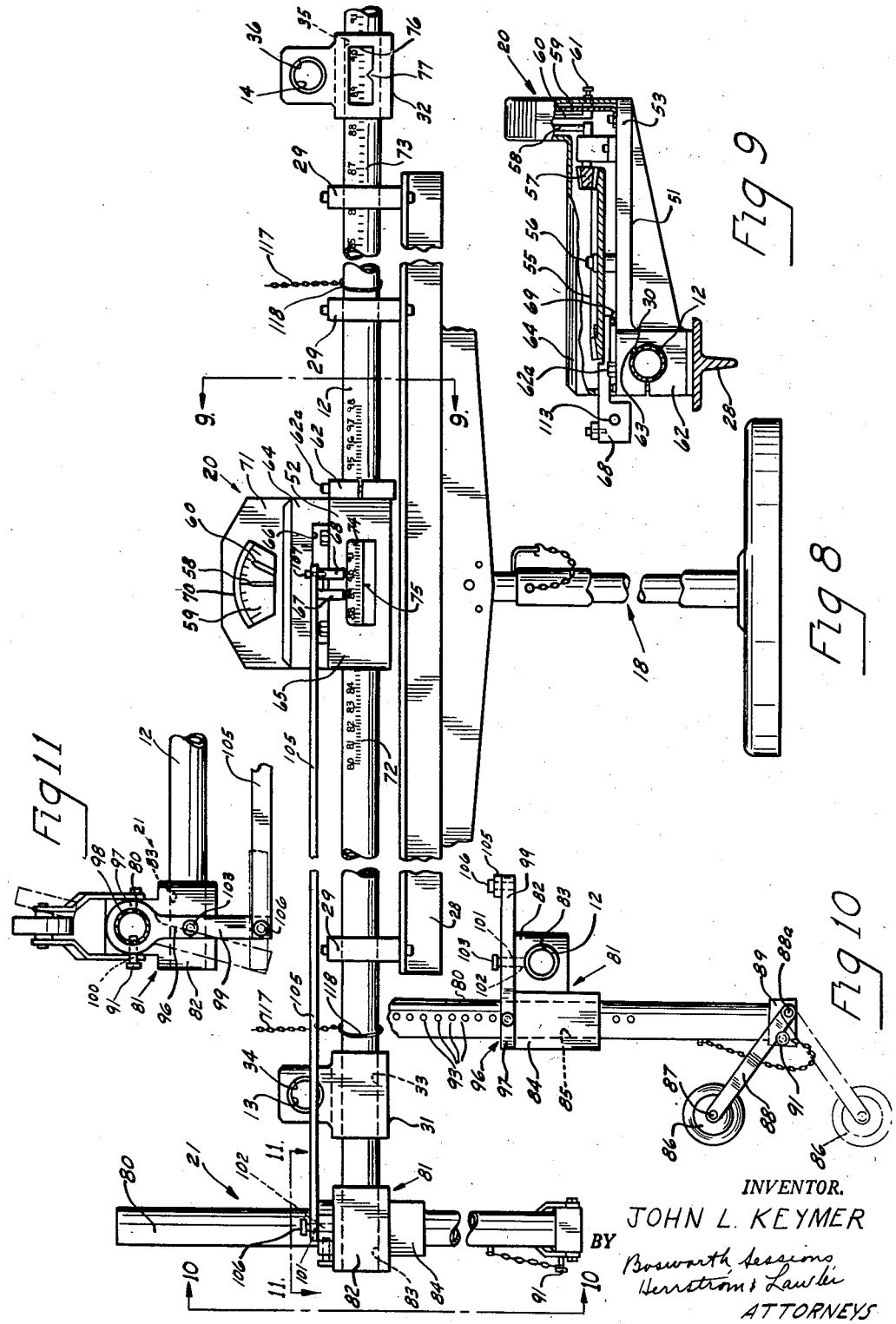
INVENTOR.
JOHN L. KEYMER
BY Bosworth Sessions
Herrstrom & Lawler
ATTORNEYS

United States Patent Office 2,845,718
Patented Aug. 5, 1958

2,845,718

AXLE ALIGNING DEVICE

John L. Keymer, Olmsted Falls, Ohio, assignor to The Trail-Rite Gauge Company, Olmsted Falls, Ohio, a corporation of Ohio Application January 18, 1955, Serial No. 482,477

5 Claims. (Cl. 33—193)

This invention relates to gauging and aligning devices for vehicle axles and in particular to an improvement in the aligning device described and claimed in Otis Patent No. 2,590,722.

Use of the Otis device in measuring alignment of the trailer axle is based on the assumption that the body or chassis of the trailer is itself longitudinally straight and true, and that the point of draft, or trailer king pin, therefore lies on the straight longitudinal center line of the body. A line from the point of draft to the mid point of the axle then corresponds to the line of draft of the trailer and the axle can be aligned accurately with respect to the true line of draft by using the king pin as a reference point. If, however, the chassis or body framework is longitudinally warped or bent, the king pin no longer is an accurate alignment reference point because a perpendicular bisector of the axle which passes through the king pin is not parallel to the line of draft. Moreover, the Otis device does not measure alignment of the vehicle framework. My invention, inter alia, comprehends a device or gauge which measures misalignment of axle independently of the king pin and which can be used effectively on a trailer or other vehicle to measure the alignment of the body framework.

A general object of my invention is the provision of an aligning gauge which determines alignment of the vehicle axle and chassis by comparing the relative positions of these parts with the true line of draft or traction of the vehicle. Another object is the provision of an aligning gauge which is capable of measuring alignment of the axle with respect to the true line of draft of the vehicle independently of the body and framework. Another object is the provision of a gauge which accurately measures the longitudinal alignment and misalignment of the chassis as well as the axle of a vehicle. A further object is the provision of a portable aligning gauge with an alignment indicating dial or indicator located for convenient reading on the gauge frame.

A specific object is the provision of a semi-trailer aligning gauge which may be mounted conveniently and quickly on trailers having different axle lengths and without interference with the under parts of the trailer. Another object is the provision of such a gauge which accurately indicates the direction and amount of misalignment of the parts without necessity of correction or compensation of the reading. A further object is the provision of means for readily comparing and measuring perpendicularity of wheel planes to axle axis in both the vertical and horizontal planes and thus provide accurate indication of straightness or of deviations from straightness of the axle.

These and other objects of my invention will become apparent from the following description of a preferred embodiment thereof, reference being had to the accompanying drawings.

Figures 1 and 2 are schematic diagrams of trailer chassis which are longitudinally straight and bent, respectively.

Figure 3 is an elevation of a semi-trailer on which the aligning device embodying my invention is mounted.

Figure 4 is a fragmentary plan view of the trailer chassis showing the alignment gauge mounted around the wheels and axle.

Figure 5 is a view showing the mechanism for measuring alignment of the wheel plane with respect to the gauge frame, the view being taken on the line 5—5 of Figure 4.

Figure 6 is a section taken on the line 6—6 of Figure 5.

Figure 7 is a fragmentary view of a portion of the mechanism shown in Figure 5, the view being taken on the line 7—7 of Figure 6.

Figure 8 is a front elevation of the gauge frame assembly and stand therefor.

Figure 9 is a transverse section taken on the line 9—9 of Figure 8 and showing details of construction of the indicator.

Figure 10 is a side elevation viewed along the line 10—10 of Figure 8 and showing the caster wheel assembly.

Figure 11 is a horizontal section of the caster wheel assembly taken on the line 11—11 of Figure 8.

Figure 12 is an elevation of an extensible tube used with the gauge for measuring alignment of the vehicle chassis.

Figure 13 is a section of a modified form of rail structure for the aligning device.

The line of draft of a vehicle, as the term is used herein, is the direction of the traction force on the point of draft of the vehicle. In the case of semi-trailers, representative of one type of vehicle on which my alignment gauge may be used, the forwardly located king pin is the point of draft of the vehicle and is located on the longitudinal center line of the trailer body or frame. If this center line is straight, which it generally is for new trailers having straight frames, the king pin can be used as a reference point for properly and accurately aligning the rearwardly located trailer axle so that the axle is perpendicular to and the planes of rotation of the wheels on the axle are parallel to a vertical plane through the true line of draft of the vehicle. When the axle is properly aligned with respect to a straight trailer body, the perpendicular bisector of the axle which passes through the king pin is in the vertical plane through the line of draft. If the trailer chassis is longitudinally bent or warped, and/or if the axle and wheel unit is laterally offset with respect to the trailer centerline, the king pin is laterally offset from the straight centerline of the rear portion of the trailer or is offset from the mid point of the axle. Under such conditions, if the axle is adjusted on the trailer chassis with the king pin as a reference point of alignment, so that a line from the king pin through the mid point of the axle is at right angles to the axle, the axle is not perpendicular to the true line of draft of the vehicle because the perpendicular bisector of the axle makes an angle with the line of draft proportional to the amount the king pin is laterally offset from the centerline of the rear of the trailer or from the mid point of the axle.

The problem is better understood by reference to the schematic diagrams of a trailer shown in Figures 1 and 2, wherein C represents the trailer chassis, A the axle, K the king pin or point of draft, and the arrows D the line of draft or the direction of movement of the point of draft. For a trailer with a straight chassis, see Figure 1, the perpendicular bisector B of the axle passes through the king pin and lies in the vertical plane through the line of draft D. Accordingly, any misalignment of the axle with respect to the king pin can be detected by noting deviation from perpendicularity between the axle and the line B running from the king pin through the mid-point of the axle. The bent chassis C' of the trailer in Figure 2 results in an offsetting of the king pin K', to the left as shown, from the rear centerline CL of the trailer and accordingly the line B' no longer lies in the vertical plane of the line of draft D' but makes an angle $\alpha$ with it. King pin K' therefore is not an accurate reference with which to compare axle alignment, and adjustment of the axle into perpendicularity with the line B' still leaves an error in the alignment of the axle and, ergo, the trailer wheels with respect to the line of draft. The same is true if the axle is laterally offset from the centerline of the rear portion of the trailer.

The gauge embodying my invention does not depend solely upon the king pin as a point of reference for establishing alignment of the parts but rather initially determines the true line of draft from actual movement of the vehicle and thereafter uses this factor as a reference for measuring alignment of the axle and for determining if the king pin and/or the axle and wheels are laterally offset from the centerline of the rear portion of the trailer chassis.

As shown in Figures 3 and 4, the gauge comprises a three-sided rectangular squaring frame 10 which fits around the outer sides and across the front of trailer wheels W and which comprises a transversely extending front rail 12 and parallel side rails 13, 14 extending rearwardly from and at right angles to the front rail 12. When the gauge is mounted on the trailer in operative position, side rails 13, 14 are juxtaposed with the outer sides of the wheels W at about axle height and are detachably connected to the ends of axle A by inwardly extending rods 16, 17. The forward parts of the gauge frame are supported either by suspension from the under side of the trailer chassis or, alternately, on a pedestal or stand 18, see Figures 3 and 8.

An alignment indicator 20, see Figures 3, 4, 8 and 9 is adjustably mounted on front rail 12 midway between the ends of the trailer axle and has pointers for indicating the true line of draft of the vehicle as detected by caster wheel assembly 21 at one side of the gauge frame, see Figures 4, 8, 10 and 11, and for comparing the relative positions of the axle and the king pin with the true line of draft. In order to measure the wheel to axle alignment, that is, to determine whether the diametric or rolling planes of both wheels W are perpendicular to the axle, measuring members 23, 24, see Figures 4–7, inclusive, are provided on rods 16, 17 adjacent wheels W.

Briefly, the alignment measuring procedure involves checking alignment of the axle mounted wheels with the gauge frame by means of members 23, 24, to determine whether the planes of the wheels are perpendicular to the axle, that is, whether the axle is straight or bent; comparing alignment of the axle with the true line of draft as determined by the caster wheel assembly 21; and checking the lateral offsetness of the king pin K or of the axle relative to the trailer chassis centerline by determining if the king pin K lies on the perpendicular axle bisector which lies in the vertical plane of the true line of draft of the vehicle. The gauge therefore is capable of indicating the existence and degree of a bend in or non-straightness of the axle, of misalignment of axle to line of draft, of misalignment between the front and rear ends of the trailer chassis, and of misalignment of axle to chassis.

The front and side rails 12, 13 and 14 of the gauge frame 10 preferably are made of aluminum stock, tubular as shown although other shapes of rails may be used. The greater portion of the span of the front rail 12 is reinforced by a T-section beam 28 to enhance the rigidity of the frame, see Figures 8 and 9, the front rail being spaced above and secured to the beam by a plurality of laterally spaced clamps 29 which grip the rail and connect to the top of the beam. A longitudinal key 30 on the front rail engages in key ways, not shown, in the clamps to locate and hold the front rail in position.

The opposite ends of rail 12 extend beyond beam 28 and carry right angle brackets 31, 32 by means of which the side rails 13, 14 of the gauge frame are connected to and extend rearwardly at right angles from front rail 12. Specifically, brackets 31, 32 are formed with bores 33, 34 and 35, 36, respectively, see Figures 8 and 11, the axes of the bores in each bracket extending at right angles to each other and closely fitting the front and side rails, respectively. Bracket 31 preferably is fixed on the front rail while bracket 32 is slidably mounted thereon for adjustably varying the lateral spacing of the side rails 13, 14 in order that the gauge can be fitted to vehicles having axles of varying lengths.

Rods 16, 17 which engage the ends of the axle A are slidably carried in right angle brackets 39, 40, see Figures 3–6, inclusive, which are similar to brackets 31, 32 and which are adjustable rearwardly on side rails 13, 14. Rods 16, 17 are carried in the lower portions of the brackets at right angles to the side rails and each preferably has a pointed inner end 40 which engages in conical recesses normally formed in the ends of the axle spindle, or in the alternative, in suitable adapters, not shown, mounted for this purpose on the hubs of the wheel. The rods 16, 17 function not only to support the gauge on the axle but also to locate the gauge frame with respect to the axle so that front rail 12 is parallel to the axle and the side rails 13, 14 perpendicular to it, assuming the axle is straight.

In order to determine whether the axle is cambered or whether the axle or spindles are bent, alignment of the planes of the wheels with respect to the gauge frame is checked by means of straight edge measuring members 23, 24 which are supported on rods 16, 17, respectively, between the adjacent wheels W and brackets 39, 40. The measuring members 23, 24 are identical in construction and mode of operation and accordingly only one will be described. Member 23 is pivotally mounted on a support block 42 by pin 43, see Figures 5, 6 and 7, and block 42 in turn is swively carried on rod 16 for rotation about the rod axis. A pin 44 carried on block 42 is engageable in apertures 45, 46 formed in the top and side of the rod and spaced 90° apart for locating the block in the proper positions corresponding to horizontal and vertical disposition of the member 23. A scale 47, see Figure 7, graduated in degrees is formed on the surface of block 42 and a pointer 48 on member 23 at its pivot point 43 indicates deviations of the measuring member from perpendicularity with rod 16.

In checking perpendicularity of the wheel planes with respect to rods 16, 17 of the gauge frame, member 23 is moved to the horizontal position and is pivoted about pin 43 until the outer ends thereof engage the rim or other part of the wheel. Since rods 16, 17 lie on extensions of a straight line between the ends of the axle deviations from zero indicated on scale 47 by the pointer 48 of member 23 constitute an indication of the direction and amount of non-perpendicularity of the wheel plane with the straight line, or with rods 16, 17, in the horizontal plane. This indicates a bent axle in the horizontal plane. When block 42 is rotated on rod 16 so that member 23 is positioned in a vertical plane, the bent condition, if any, of the axle in a vertical plane can be measured. If there are no deviations indicated on scale 47 by pointer 48, the axle is straight.

In order to compare alignment of the axle and the king pin with respect to the true line of draft of the vehicle, an indicator generally designated at 20, see Figures 4, 8 and 9, is mounted on front rail 12. The indicator 20 comprises a base 51 having a front portion 52 supported on front rail 12. The rear portion 53 of the base carries motion amplifying mechanism, preferably comprising a horizontal bevel gear 55 mounted on a vertical pivot 56 and an engaging pinion 57, and also supports an upwardly projecting pointer 58 movable in response to the rotation of the pinion, and a vertical dial plate 59 graduated in degrees. Another pointer 60 is supported on the base in juxtaposition with pointer 58 and is movable selectively and manually across dial 59 by rear knob 61. A split clamp block 62 secured on the forward portion 52 of the indicator base by clamp screw 62a locks the indicator in laterally adjusted positions on the front rail 12. A keyway 63 formed in the clamp block 62 engages the longitudinal key 30 on rail 12 and thus the indicator is supported on the rail in the upright position shown in the drawings.

A cover 64 fits over and is secured to the top of base 51 for protectively enclosing the gear mechanism, pointers, and dial. The front wall 65 of the cover 64 has an opening 66 through which a pair of laterally spaced gear actuating lugs 67, 68 extend from their common rearward connection 69 to bevel gear 55 forwardly and beyond the front wall of the indicator. Lateral motion of lugs 67, 68 is amplified by gear 55 and pinion 57 and is indicated by pointer 58 as a measurable deviation on scale 59. A window 70 in the front of the vertical extending portion 71 of the cover 64 permits convenient reading of the indications of pointers 58 and 60 on dial 59 from a position in front of the gauge.

In order to insure that indicator 20 is positioned on front rail 12 exactly mid way between the ends of the axle on which the gauge is mounted, graduated scales 72 and 73 are formed on the forward face of the mid and end portions of the rail 12 over which the indicator 20 and the adjustable side rail bracket 32, respectively, are movable. The front of the indicator base has an opening 74 through which the scale 72 can be viewed and an index line 75 in alignment with the vertical axis 56 of the bevel gear 55 is formed on the base adjacent opening 74 to register with the scale 72. Bracket 32 likewise has a front opening 76 through which scale 73 can be viewed and is formed with a central index point 77 for registering with scale 73.

Bracket scale 73 is graduated in inches corresponding to the length of front rail 12 measured from the axis of side rail 13 which is fixed relative to the front rail by bracket 31. The lateral spacing between side rails 13, 14 therefore is read on scale 73 opposite index 77 of bracket 32. Scale 72 for the indicator is graduated in half-inches but is calibrated in whole numbers corresponding to those of bracket scale 73. Thus when the side rails 13, 14 are spaced apart by a certain distance, say 96 inches, as read on scale 73, movement of the indicator 20 on rail 12 until index line 75 is opposite number "96" on scale 72 places the pivotal axis 56 of indicator gear 55 mid way between the side rails. In other words, movement of indicator 20 laterally on the rail 12 through one unit of length on scale 72 equals one-half the displacement of bracket 32 over one unit of length on the scale 73 and proper positioning of the indicator mid way between the side rails and, ergo, the ends of the axle is facilitated by adjusting the position of the indicator to the same reading on scale 72 as appears on scale 73 opposite bracket index 77.

Lugs 67, 68 are connected to gear 55 of the indicator in such a manner that index line 75 on the indicator base is mid way between the lugs when the indicator pointer 58 points to the middle or zero point on the scale on the indicator dial 59.

In order to determine the true line of draft of the vehicle and to record same on indicator 20, the caster wheel assembly 21 is mounted on the outer, left as viewed in Figure 8, end of front rail 12. This assembly comprises a vertical swivel stem or tube 80 supported rigidly on the end of front rail 12 by a right angle bracket 81 having a front portion 82 with a horizontal bore 83 for receiving the front rail and a rear portion 84 having a vertical bore 85 in which swivel tube 80 is fitted for pivoting about a vertical axis. The lower end of swivel tube 80 carries a caster wheel 86 pivotally journalled at 87 on the end of a fork 88 which in turn is pivotally connected at 88a to a sleeve 89 fixed on the lower end of the swivel tube. Fork 88 can swing vertically about its pivotal axis 88a to raise and lower wheel 86 between a retracted or inoperative position, indicated in solid lines in Figure 10, to lower or operative position, shown in broken lines in Figure 10, below the swivel tube and in contact with the ground. A pin 91 removably engageable in a suitable aperture in sleeve 89 serves to hold the fork and caster wheel in the raised position when not in use.

Preferably swivel tube 80 is adjusted vertically in bracket 81 to space the lower tube end from the ground sufficiently so that fork 88 makes an angle of 45° or less with a horizontal plane through the fork pivot 88a when wheel 86 rests on the ground. Accordingly the upper portion of swivel tube 80 is formed with a series of vertically spaced position holes 93, and a lock pin 94, engageable in one of the tube holes 93, locks the tube on the gauge frame in vertically adjusted position relative to the ground. When wheel 86 is lowered to the operative position in contact with the ground, movement of the vehicle being gauged causes swivel tube 80 to rotate about its vertical axis as caster wheel 86 aligns itself with the line of draft of the vehicle. The total angular displacement of tube 80 as a result of this operation is a measure of alignment of the gauge frame with respect to the true line of draft of the vehicle and is used to establish an indication of line of draft on indicator 20 as will appear below.

In order to transmit angular displacement of the swivel tube 80 to the indicator gauge, a crank 96, see Figures 8, 10 and 11, is fitted over and is secured to the tube on top of bracket 81. Crank 96 has a hub portion 97 formed with a bore 98 through which tube 80 extends, and a forwardly extending crank arm 99 which projects beyond the front portion 82 of bracket 81. The hub portion 97 of crank 96 has a transverse pin hole 100 formed in the side thereof through which pin 91 extends for locking the crank to the swivel tube. Crank arm 99 has a vertical pin hole 101 in the portion thereof which overlies the front bracket portion 82 which also has a vertical hole or recess 102. Holes 101 and 102 are adapted to register with each other for one position of the crank arm 99, and a locking pin 103 is engageable in the holes to lock the crank and bracket 81 together. When hole 101 in crank arm 99 register with hole 102 in bracket 81, the angular position of swivel tube 80 relative to the rear portion 84 of the bracket is such that the plane of rotation of wheel 86 is parallel to side rail 13. In other words, when pins 91 and 103 are inserted in appropriate holes to lock crank 96 to swivel tube 80 and to front portion 82 of the bracket 81, the tube is so positioned relative to the gauge frame that the caster wheel axis 87 extends parallel to front rail 12 of the gauge frame.

In order to transmit swiveling motion of the caster tube 80 to the indicator when the vehicle is moved and to thereby establish a reading on the indicator corresponding to alignment of the gauge frame with the line of draft of the vehicle, a detachable cross link 105 is provided to connect the forward end of crank arm 99 to one of the indicator actuating lugs 67, 68. Removable pins 106, 107 extend through suitable holes in the ends of the link 105 and in crank arm 99 and the top of lug 68 to make this connection. Lateral movement of link 105 in response to swiveling of the caster tube 80, as indicated in broken lines in Figure 11, causes pointer 58 to move across dial 59 in proportion to the angular displacement of the tube. The indicator 20 is properly zeroed if pointer 58 points to zero in the center of the dial 59 when the caster wheel axis is parallel to front rail 12 of the gauge frame, that is, when crank arm 99 is locked to bracket 81 by pin 103. Adjustment of pointer 58 may be necessary to initially zero the instrument. The indicator reads zero when the plane of rotation of wheel 86 is perpendicular to front rail 12.

In order to check alignment of the king pin K with respect to the line of draft and with respect to the axle A, a substantially rigid extensible rod 110, see Figure 12, is provided for connecting to and projecting forwardly from indicator 20. Rod 110 preferably comprises a plurality of tubes 110', 110" and 110'" successively telescoped within each other to permit the rod to be extended sufficiently to reach from the indicator to the king pin K at the forward end of the trailer chassis. The rear end of the rod carries a mounting block 111 which fits snugly between indicator actuating lugs 67, 68 and is secured thereto by a suitable pin, not shown, engageable in apertures 112, 113 in the sides of the block 111 and lugs 67, 68, respectively. When the rod 110 is connected to lugs 67, 68, the extension of the rod axis passes through the vertical pivot 56 of indicator gear 55.

With the cross link 105 disconnected from and rod 110 connected to the indicator lugs, pointer 58 on the indicator is responsive to lateral movements of the rod. When pointer 58 indicates the same reading on dial 59 as the pointer did when measuring the line of draft sensed by the caster wheel assembly 21, it means that rod 110 makes the same angle with front rail 12 of the gauge frame as does the true line of draft and that rod 110 lies along the bisector of the axle and is in a vertical plane parallel to or containing the line of draft of the vehicle. If this condition occurs when the front end of the rod contacts king pin K, the latter also lies on the axle bisector which coincides with the true line of draft, and accordingly, for practical purposes, the trailer chassis is straight. If, however, the rod must be moved to the right or left of such axle bisector in order to contact the king pin, that is, if, when the rod contacts the king pin, pointer 58 indicates a reading different from that of the true line of draft, this means that the axle and the king pin are laterally offset relative to each other. Such a condition will exist if the chassis is distorted or longitudinally bent, or if the trailer axle is laterally offset from the chassis center line, or both. Any lateral displacement of the axle with respect to the chassis can be readily determined and corrected, leaving a measurable error in chassis alignment. Thus the degree of offsetness, if any, of the front trailer end from the rear end is determined and measured. In order to facilitate measurement of the alignment of the king pin, rod 110 has a forward end hook 115 which is engageable in a suitable adapter 116, see Figure 3, fitted over the king pin.

The gauge is used in the following manner to measure alignment of the axle and trailer chassis and to check straightness of the axle. Gauge frame 10 is supported with front beam 28 resting on stand 18 and is arranged to encompass the front and outer sides of the trailer wheels W. Side rail 14 is moved toward the opposite side rail by sliding bracket 32 along front rail 12 until the inner ends 40 of rods 16, 17 on the side rails engage the outer ends of the axle spindle or suitable adapter. Bracket 32 is then tightened on front rail 12. Indicator 20 is positioned mid way between the ends of the axle by moving the whole indicator along front rail 12 until index line 75 on the indicator base registers with the reading on scale 72 corresponding to reading on scale 73 opposite the index 77 of bracket 32.

The perpendicularity of each wheel with respect to a straight line between the ends of the axle is then checked and deviations are measured by means of straight edge member 23 to indicate straightness or lack of straightness of the axle. Swivel block 42 which carries member 23 is adjusted axially on each of the rods 16, 17 until feelers on member 23 engage the wheel rim or hub. By rotating block 42 about the rod axis, member 23 is positioned successively in the horizontal and vertical planes and readings on the condition of straightness of the axle, that is, perpendicularity or non-perpendicularity of the wheel planes with respect to rods 16, 17, are indicated on scales 47 of blocks 42. If axle A is straight, pointers 48 indicate zero on scales 47 since the wheels are mounted concentrically of the axle spindles and lie in planes perpendicular to the axle and spindle axis. If the axle is bent, however, pointers 48 indicate the amount and direction of the bend so that this condition can be corrected.

In order to determine the true line of draft of the trailer and to compare same with the position of the gauge frame and the axle by means of the indicator 20, the front of gauge frame 10 is suspended from the underside of the chassis by means of chains 117, see Figures 3 and 8, which engage rings 118 on front rail 12, and stand 18 is lowered to a non-supporting position or is removed entirely. With crank 96 locked to caster tube 80 and to the top of front portion 82 of bracket 81 by means of pins 91 and 103, respectively, cross link 105 is connected to crank arm 99 and to indicator actuating lug 68. Indicator needle 58 is then checked and adjusted, if necessary, to read zero on dial 59. Caster wheel 86 is then lowered to the ground and crank lock pin 103 is removed from crank arm 99 to permit the crank to pivot with tube 80.

The whole trailer is then moved forwardly by a tractor or other prime mover along a preferably straight line for a short distance, say two to three feet. During this travel, caster wheel 86 aligns itself with the true line of draft of the trailer. Any angular displacement or swivelling of tube 80 which results causes pointer 58 of the indicator to register a deviation from zero on dial 59. This reading indicates the direction and amount which axle A deviates from perpendicularity with the line of draft. The manual set pointer 60 is then adjusted to underlie pointer 58 to retain this reading for future reference.

Cross link 105 next is disconnected from the indicator lug 68 and telescopic rod 110 is connected between the lugs 67, 68 so that needle 58 becomes responsive to lateral movements of the rod 110. The front end of the rod 110 is extended forwardly and is connected to king pin K. If indicator pointer 58 lines up with manual set pointer 60, this means that the angle between rod 110 and the axle is the same as the angle between the line of draft and the axle, or, in other words, that king pin K lies in a vertical plane containing the axle bisector and the rearward extension of the line of draft. This indicates that the relative positions of king pin and the axle are correct, that is, that the axle is correctly aligned with respect to the king pin and that the trailer chassis is straight and true. Proper alignment of the axle into perpendicularity with the line of draft is acomplished by adjustably pivoting the axle about a vertical axis and relative to the chassis until pointer 58 reads zero.

If, however, pointer 58 does not coincide with the manual set pointer 60, it means that the angle which rod 110 makes with axle A is different from the angle that the line of draft makes with the axle, and thus the difference between the readings of pointers 58 and 60 is a measure of the direction and amount of deviation of the king pin from the plane containing both the axle bisector and the line of draft. This indicates that the chassis is longitudinally bent or warped to one side or the other, or that the axle is displaced laterally from the chassis center line, or both.

Lateral displacement of the axle on the chassis can be determined readily, for example, by measuring and comparing the distances between index line 75 on the indicator and opposite sides of the chassis. If the distances are equal, the axle is not displaced on the chassis; if the distances are unequal, the axle is displaced, and this error can be corrected by adjusting the connections of the axle to the chassis. If pointers 58 and 60 still show different readings after such lateral adjustment of the axle, longitudinal distortion of the chassis is indicated.

If the degree of misalignment of the chassis, as indicated by the difference in readings of pointers 58 and 60, is considerable, the chassis should be straightened. A longitudinally bent trailer can be a serious hazard on the road since the rear end of the trailer does not track the prime mover and the driver cannot sense the position of the trailer end with respect to the cab. If chassis misalignment is small, or if straightening of the chassis is otherwise not desirable, the axle is adjusted on the chassis into perpendicularity with the line of draft by the provided means of adjustment such as radius rods and the like which connects the axle to the trailer chassis. The wheels W, as a result of such axle adjustment, are brought into alignment with the true line of draft of the vehicle and undue wear of the tires resulting from misalignment of trailer parts is eliminated.

Figure 13 illustrates a modified form of gauge frame construction wherein an I-beam 125 is used as a front rail. The top flange 126 of the beam is machined and formed with a longitudinal groove 127 by means of which the side rails 13, 14 and indicator 20 are secured to and are slidable along the beam. As shown in the drawing, side rail 14 has a guide lug 128 which fits into the groove 127, the parts being formed such that rail 14 extends at right angles to the beam axis when so connected. A similar connection is made between the beam and the indicator. This construction involves less machining than the above described embodiment and is quicker and less expensive to fabricate.

Modifications and changes to the above described preferred embodiment of my invention will occur to those skilled in the art without, nevertheless, departing from the precepts and principles of my invention. Accordingly I do not wish my patent to be limited in any way which is inconsistent with the progress my invention has made in the art.

I claim:

1. Apparatus for measuring alignment of a trailer having laterally spaced wheels and an interconnecting axle at the rear and a king pin in the forward end thereof, comprising a frame having a cross rail and laterally spaced parallel side rails connected to and projecting at right angles from said cross rail, means for supporting said frame, means connecting said side rails to opposite ends of the axle, an indicator on said cross rail located midway between the ends of the axle, caster means swivelly supported on said frame and engageable with the trailer supporting surface, said caster means automatically being alignable with the line of draft of the trailer when said trailer is moved, means operably connecting said caster means to said indicator whereby the indicator registers deviations of said caster means from perpendicularity with the cross rail, and means engageable with the king pin and operably connected to the indicator for comparing alignment of the king pin relative to a point midway between the ends of said axle and relative to the line of draft of the vehicle.

2. Alignment measuring apparatus for a semi-trailer having a rear axle and a forwardly located king pin, comprising a frame having a cross rail and laterally spaced side rails supported on the ends of the trailer axle, said side rails being parallel to each other and perpendicular to said cross rail, means for supporting said frame, an indicator mounted on said cross rail midway between the ends of said axle, means operably connected to said indicator for sensing deviations from parallelism between said side rails and the line of draft of the trailer, and rod means operably connected to said indicator and extending forwardly therefrom and engaging said king pin, said indicator being responsive to lateral movements of said rod means whereby to indicate deviations of said rod from perpendicularity with said frame front rail.

3. The apparatus according to claim 2 in which an extension of the longitudinal axis of said rod means substantially bisects said axle.

4. Aligning apparatus for a trailer having rear wheels and an interconnecting axle, comprising a frame having a cross rail detachably connected to the ends of the axle, said rail extending parallel to said axle, means for supporting said rail, an indicator movably mounted on said rail, caster means on said frame comprising a caster stem depending from said frame, a fork on said stem, a caster wheel engageable with the vehicle supporting surface and rotatably carried on said fork, a link connecting said indicator to said stem whereby said indicator is responsive to rotational movement of said stem about its axis.

5. Aligning apparatus for a trailer having a rear axle and a forwardly mounted king pin, comprising a frame adapted to be brought into juxtaposition to said axle, said frame having a cross rail extending parallel to said axle, means for supporting said rail, an indicator moveably mounted on said rail between the ends of said axle, means on said frame for detecting the line of draft of the trailer and for indicating readings of deviations of said rail from perpendicularity with the line of draft on said indicator, a rigid rod connected to said indicator and extending forwardly therefrom and engageable with said king pin, said indicator measuring the angle between said rod and said rail and comparing same with said readings to determine longitudinal alignment of said trailer.

References Cited in the file of this patent

UNITED STATES PATENTS

| | | |
|---|---|---|
| 1,438,346 | Tharp | Dec. 12, 1922 |
| 1,992,521 | Craegmille | Feb. 26, 1935 |
| 2,000,866 | Smith | May 7, 1935 |
| 2,000,993 | Schmidt | May 14, 1935 |
| 2,003,178 | Duby | May 28, 1935 |
| 2,070,518 | Smith | Feb. 9, 1937 |
| 2,137,485 | Greenleaf et al. | Nov. 22, 1938 |
| 2,184,505 | Danley | Dec. 26, 1939 |
| 2,479,723 | Brown | Aug. 23, 1949 |
| 2,556,227 | Shaw | June 12, 1951 |
| 2,571,287 | Peters | Oct. 16, 1951 |
| 2,582,427 | Greenleaf | Jan. 15, 1952 |
| 2,590,722 | Otis | Mar. 25, 1952 |
| 2,618,072 | Krumm | Nov. 18, 1952 |

FOREIGN PATENTS

| | | |
|---|---|---|
| 864,005 | Germany | Jan. 22, 1953 |